United States Patent [19]

Shen

[11] Patent Number: 4,809,780
[45] Date of Patent: Mar. 7, 1989

[54] METHOD FOR SEALING THIEF ZONES WITH HEAT-SENSITIVE FLUIDS

[75] Inventor: Joseph J. S. Shen, Brea, Calif.

[73] Assignee: Chevron Research Company, San Francisco, Calif.

[21] Appl. No.: 149,801

[22] Filed: Jan. 29, 1988

[51] Int. Cl.$^4$ .......................................... E21B 33/138
[52] U.S. Cl. .................... 166/272; 166/65.1; 166/248; 166/273; 166/288; 166/302
[58] Field of Search ............... 166/272, 273, 275, 302, 166/248, 65.1, 288

[56] References Cited

U.S. PATENT DOCUMENTS

| | | | |
|---|---|---|---|
| 3,070,159 | 12/1962 | Marx | 166/261 |
| 3,620,302 | 11/1971 | Parsons | 166/258 |
| 3,669,188 | 6/1972 | Coles et al. | 166/270 |
| 3,857,776 | 12/1974 | Titus et al. | 204/290 R |
| 4,013,538 | 3/1977 | Schneider et al. | 204/280 |
| 4,199,025 | 4/1980 | Carpenter | 166/272 |
| 4,228,853 | 10/1980 | Harvey et al. | 166/65.1 |

Primary Examiner—Jerome W. Massie
Assistant Examiner—Terry Lee Melius
Attorney, Agent, or Firm—S. R. LaPaglia; E. J. Keeling; E. A. Schaal

[57] ABSTRACT

A method is disclosed for selectively sealing thief zones in a formation. First, a saline pre-flush water is injected into the formation. Then, at least one slug of a saline soution of heat-sensitive sealing fluid is injected into the formation, followed by injection of a saline push water. Electrical resistance heating of the formation is induced sufficient to cause the sealing fluid to undergo in-situ transformation to seal the thief zones.

12 Claims, 2 Drawing Sheets

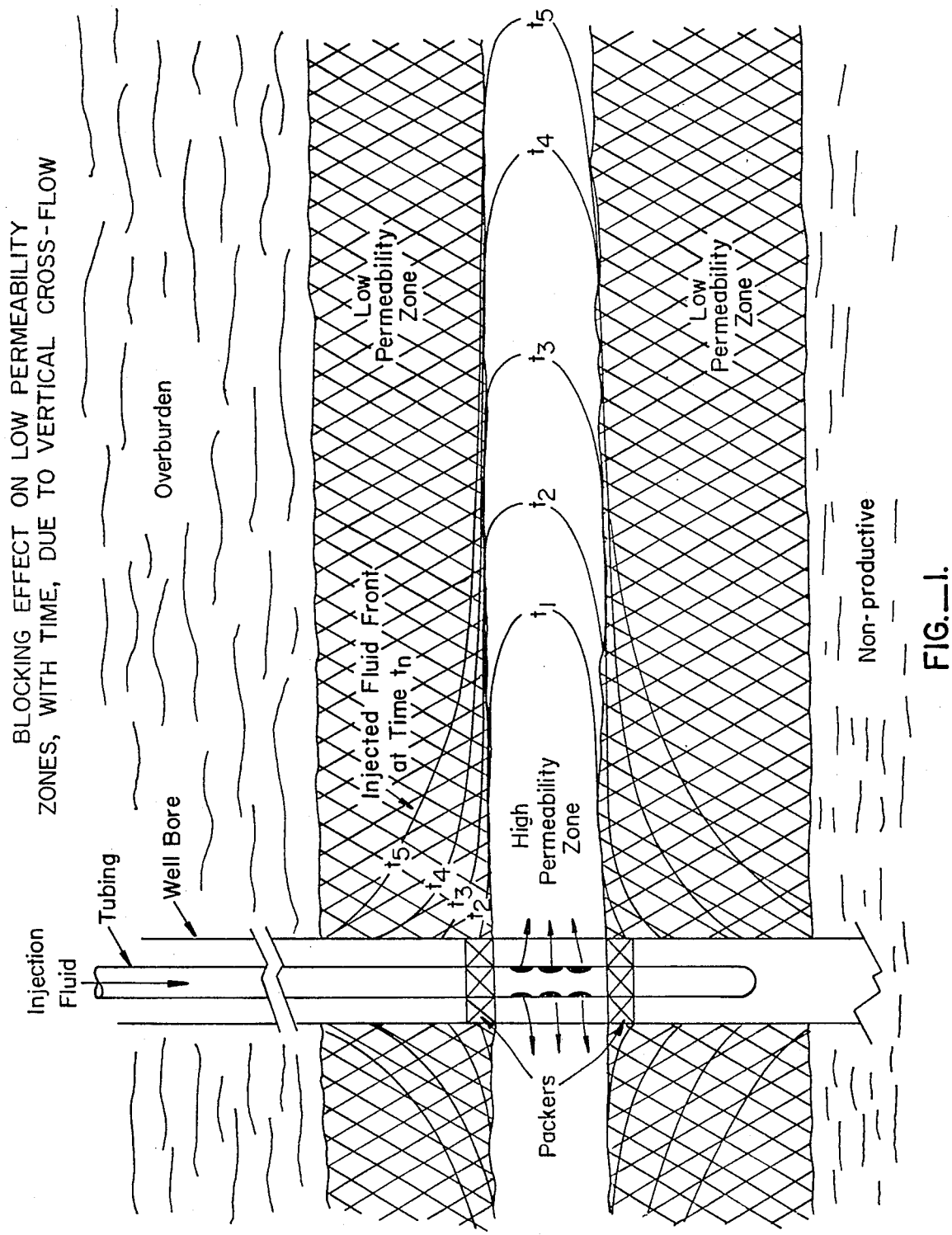
FIG._1.

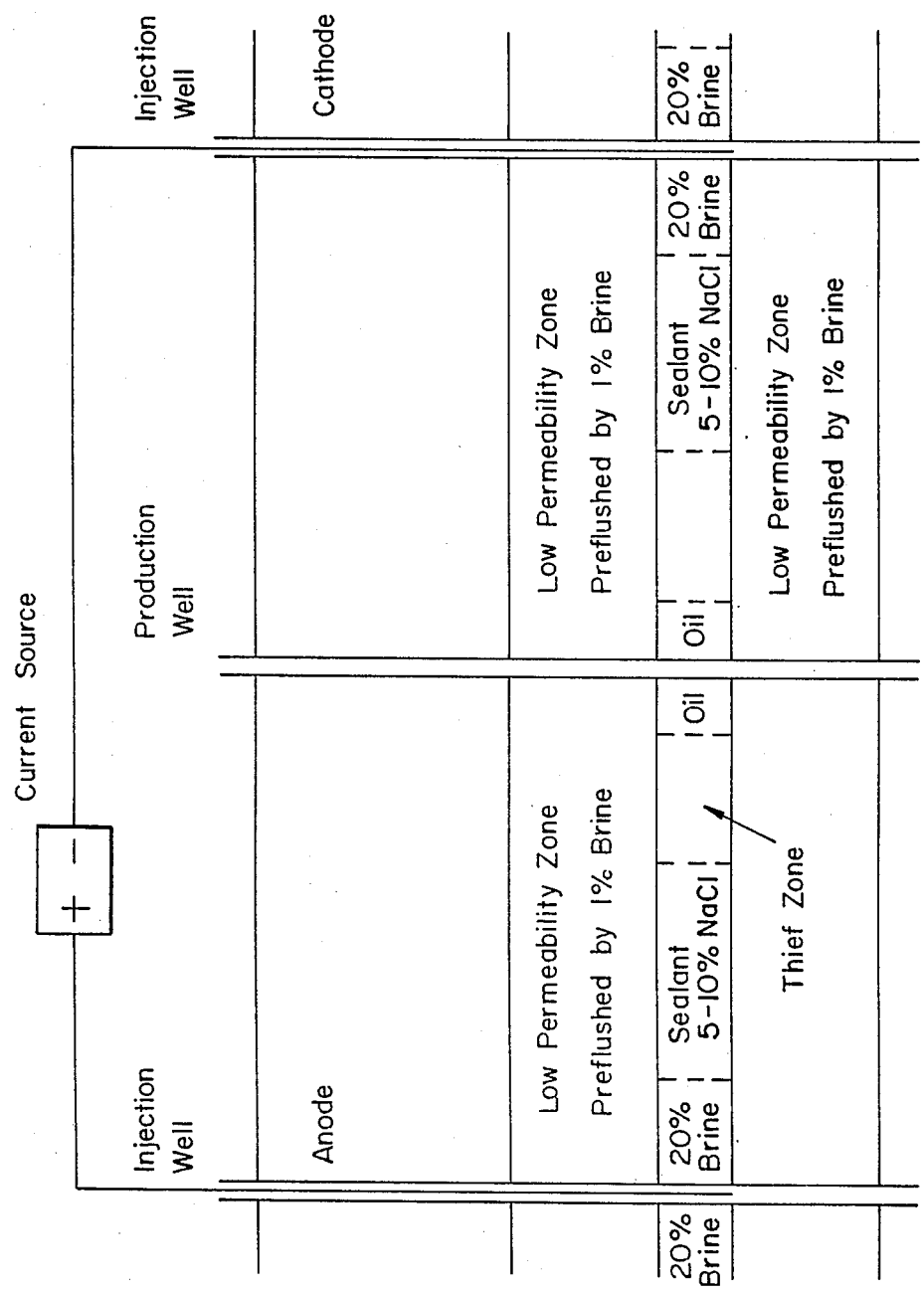
FIG._2.

METHOD FOR SEALING THIEF ZONES WITH HEAT-SENSITIVE FLUIDS

The present invention relates to a method for selectively sealing thief zones in a formation.

BACKGROUND OF THE INVENTION

Wells are usually drilled through a formation that contains earth layers of different permeabilities. These wells are often lined with casing and cement that have perforations open along part of the well. Preferably, the fluid flow rate into and out of each layer should be about equal. If the permeability of one layer is anomalously high, the fluid flow rate in that layer is higher than in the other layers. Such a high permeability layer is called a "thief zone".

One of the best ways to improve sweep efficiency of a chemical flood or water flood is by sealing the thief zones deep inside the formation. Silva et al.'s mathematical model ("Waterflood Performance in the Presence of Stratification and Formation Plugging," SPE Paper No. 3556, 46th SPE Annual Meeting, New Orleans, Oct. 3 through 6, 1971) showed that sealing a thief zone at the wellbore was not enough. When the thief zone is sealed only near the wellbore, the flow behavior continued just beyond the sealed region as if no sealing had occurred. Unfortunately, most known methods tend to seal the thief zones only near the wellbore.

A more promising technique is to cause an in-situ change of the injection fluid in order to deeply penetrate the thief zone before sealing takes place. Two such commercial methods are now being used. One method is in-situ polymerization of carefully spaced slugs of monomer and catalyst. In theory, mixing these slugs deep inside the formation produces the desired polymer matrix and seals the thief zone. However, given the complexity of flow behaviors of slugs in a heterogeneous formation, it is difficult to place the polymer matrix where desired. The other method is time-delayed gelling of polymers. But the delay time may only be a few days (e.g., 48 to 72 hours for xanthan gum by chromium ions). Such short times prevent a deep penetration of the sealing fluid into the thief zone.

U.S. Pat. No. 3,620,302 to Robert Parsons teaches plugging thief zones with an inorganic silicate. An aqueous solution of the silicate is injected into the thief zones, in-situ combustion is generated in a nearby zone, and that combustion is sustained until enough heat is transferred to the thief zones to cause the silicate to intumesce and seal the thief zones. Unfortunately, such in-situ combustion cannot be used in most fields.

U.S. Pat. No. 3,669,188 to Roy Coles et al. teaches using a plugging fluid that reacts to deposit a plugging material as temperature increases. The thief zone near the well is heated so that it is hotter than the surrounding regions, then the plugging fluid is injected into that zone, and then unreacted plugging fluid is displaced after plugging has occurred. Preferably, the plugging fluid is an aqueous solution of a metal and a reactant. The metal precipitates as a gelatinous metal hydroxide and the reactant increases the solution pH to cause that precipitation. Preferably, slugs of hot water are used to heat the thief zone. This injected hot water, however, may lose a substantial amount of energy, making the process less effective deep inside the thief zone, where plugging is needed the most. Basically, this method was designed to apply in the "near well" region (less than twenty feet from the wellbore).

Electrical heating has been patented in U.S. Pat. Nos. 3,857,776 and 4,013,538. Such methods have been discounted as drive methods for tar sands recovery in that the temperature rise in the formation during that type of heating appears to be confined to a narrow path from one electrode to the other.

SUMMARY OF THE INVENTION

The shortcomings of the above methods may lie in how the sealing is triggered. The present invention uses a mechanism that allows better control of the timing, placement, and effectiveness of the change inside the thief zone. It involves the in-situ change of a heat-sensitive sealing fluid which is triggered by electrical heating.

More precisely, the present invention seals thief zones in four steps. First, a saline pre-flush water is injected. Then, a saline solution of heat-sensitive sealing fluid is injected. Then, a saline push water is injected. And then, an electrical resistance heating of the formation is induced sufficient to cause the sealing fluid to undergo in-situ transformation to seal the thief zones.

A major advantage of the present invention is that the triggering method is operator-controlled. Conventional processes use internally-induced triggering methods. Because the triggering method of the present invention is operator-controlled, the sealing occurs deeper in the formation.

Another major advantage of the present invention is that the temperature rise is confined to a narrow path of electrical current from one electrode to the other. This narrow path is through the path of least resistance (the thief zones). Thus, a disadvantage for heating a formation for enhanced oil recovery becomes an advantage in our process.

Preferably, mechanical packers are used so that the sealing fluid and push water are injected only into the thief zones.

Preferably, the electrical heating is induced after the sealing fluid has traveled at least one-third the distance between the injection well and a production well, and after the push water has traveled at least one-tenth that distance. In one embodiment, that heating is induced between two diagonal injection wells in a five-spot pattern.

The sealing fluid is either an alkaline metal silicate or a lignosulfonate. That fluid has a higher salinity than that of the pre-flush water, but has a lower salinity than that of the push water.

BRIEF DESCRIPTION OF THE DRAWINGS

In order to facilitate the understanding of this invention, reference will now be made to the appended drawings of preferred embodiments of the present invention. The drawings are exemplary only, and should not be construed as limiting the invention.

FIGS. 1 and 2 are schematic vertical section illustrations of an injection. Shown are injection wells, a production well, and the surrounding earth formations.

DETAILED DESCRIPTION OF THE PREFERRED EMBODIMENTS

In its broadest aspect, the present invention is a method for selectively sealing thief zones by causing a heat-sensitive sealing fluid to undergo an in-situ transformation within those zones. That transformation is triggered by electrical resistance heating of the formation.

Numerous methods have tried to seal thief zones to a great distance. Usually these methods use time-delayed gelation or multiple-slug injection of reactive sealing fluids. However, long injection times are needed for deep placement of blocking materials. During that time, crossflow between zones can cause problems. The injected sealing fluid will gradually crossflow into adjacent zones near the wellbore, as shown schematically in FIG. 1. With long placement times, enough crossflow could occur near the wellbore to block both the high and low permeability zones. No prior art method appears to be capable of stopping that invasion of sealing fluid into low permeability zones.

The present invention selectively seals thief zones in a formation. By "selectively sealing" those zones, we mean sealing those zones in such a way as not to seal adjacent zones of lower permeability.

In the present invention, a saline pre-flush water is injected into the injection well, followed by at least one slug of a saline solution of heat-sensitive sealing fluid. The solution of sealing fluid is spiked with a high concentration of salts to achieve high conductivity and low resistivity. After the slug is placed deep inside the formation with the aid of a saline push water, electrical conductors are lowered into the formation. An AC electric current flow is impressed to the conductors and the formation is heated up by the resistivity of the conducting brine. Due to the high conductivity imparted to the heat-sensitive sealing fluid, the slug heats up preferentially. The heated sealing fluid undergoes an in-situ transformation to seal the thief zones. After the heating process is completed, the conductors are retrieved.

THE INJECTION OF PRE-FLUSH WATER

In the first step of the present invention, a saline pre-flush water is injected into the formation. "Salinity" is a measure of the salt concentration of water or an aqueous solution. The salinity of the pre-flush water is at least 1 wt. %.

THE INJECTION OF HEAT-SENSITIVE SEALING FLUID

In the second step, at least one slug of a saline solution of heat-sensitive sealing fluid is injected into the thief zones. By "heat-sensitive sealing fluid," we mean an aqueous solution of a material that will produce a transformation upon heating. The salinity of that solution should be higher than that of the pre-flush water. For instance, the salinity could be from 5 to 10 wt. %. That solution may be injected in multiple slugs separated by water for added plugging effect.

There are many types of sealing fluids that will work. They include: alkaline metal silicates, metal hydroxides with pH alteration components, monomers or comonomers and marginally stable latexes. Preferably, the sealing fluid is either an alkaline metal silicate or a lignosulfonate.

Useful sealing fluids include the water soluble metal silicates, especially silicates of sodium, potassium, lithium, rubidium, cesium, and francium. These silicates expand by swelling upon heating. They are cited in U.S. Pat. No. 3,620,302, which is incorporated herein by reference for all purposes. Silicates of sodium and potassium are preferred. Also, sodium or potassium orthosilicates, disilicates, metasilicates, or sesquisilicates may be used. Useful sodium silicates include waterglass, liquid porcelain, and liquid glass.

The solutions of sealing fluids can contain from 3 to 65 wt. % silicates. Preferably, the solutions contain from 10 to 50 wt. % silicates. More preferably, the solutions contain from 15 to 40 wt. % silicates.

Another sealing fluid consists of a metal hydroxide and a pH alteration component. This fluid was cited in U.S. Pat. No. 3,669,188, which is incorporated herein by reference for all purposes. The metal hydroxide precipitates at a high pH, and the pH alteration component raises the pH to cause that precipitation.

Suitable metal hydroxides comprise nearly any salt that is soluble in a low pH aqueous solution (pH of 2 to 7) and is precipitated at a higher pH (pH of 7 to 10). The preferred salts are salts of metals which form gelatinous metal hydroxides or hydrated metal oxide of very low solubility. Such metals include chromium, aluminum, iron, copper, bismuth, etc. The preferred salts of such metals have a high solubility in solutions having a pH of from 2 to 7, such as the chlorides, nitrates, acetates, etc.

Suitable pH alteration components comprise nearly any water-soluble compounds which react with water to increase the pH of the solution in such a manner that the metal salt is precipitated. Suitable pH alteration components include water-soluble amides of carbamic acid, carbonic acid halides, urea, salts of cyanic acid. An example of a water-soluble amide of carbamic acid is ammonium carbamate. Examples of salts of cyanic acid include alkali metal cyanates and cyanamide. Preferred pH alteration components include urea and potassium cyanate.

The solution of sealing fluid can contain other ingredients as long as they do not interfere with the functions of the sealing fluid. For instance, where a thief zone contains relatively large pores, the fluid can contain a suspension of finely divided solid materials, such as crushed sand grains, carbonates, etc., to aid in reducing permeability. In treating water-sensitive clay, clay-stabilizing agents can be added, such as neutral salts, amines, amine salts, etc. Also, thickening agents can be used, such as carboxymethyl cellulose, polyacrylamides, etc.

THE INJECTION OF PUSH WATER

In the third step, a saline push water is injected into the thief zones. The salinity of that push water should be higher than that of the solution of sealing fluid. For instance, the salinity could be 20 wt. %.

The injection of sealing fluid and push water into zones other than the thief zones can be reduced by packing off the completion zone from other than the thief zones. This can be done with mechanical packers.

THE ELECTRICAL RESISTANCE HEATING

In the fourth step, electrical resistance heating is induced in the formation to trigger the sealing of the thief zones. Since most of the sealing fluid passes through the thief zones, those zones provide the highest conductivity path, and therefore are selectively heated. As the temperature rises in the thief zones, the conductivity increases, thereby confining the heating process there. When the temperature becomes high enough, the heat-sensitive sealing fluid undergoes in-situ transformation and plugs off the thief zones.

By "electrical resistance heating," we mean heating of a formation caused by passing an electrical current through it, wherein the formation's electrical resistance converts the current to heat.

By "in-situ transformation," we mean that there is a change in the fluid in-situ within the formation.

Electrical resistance heating has been discounted as a drive method for tar sands recovery because heating is confined to the narrow path of least resistance from one electrode to the other. When a saline sealing fluid is used, the thief zones would be in that narrow path. Thus the heating would be confined to those thief zones. Thus, the characteristic of electrical resistance heating that makes it impractical for tar sands recovery makes it ideal for the present application.

Electrical heating has been cited in U.S. Pat. Nos. 3,857,776 and 4,013,538. Those patents are incorporated herein by reference for all purposes. For instance, U.S. Pat. No. 4,013,538 teaches an electrode for ground conduction of electric current in a saline environment under high hydrostatic pressure. It has a hollow electrode having a cable terminal at its upper end and affixed to the lower end of an insulating cable conduit. A fluid supply conduit surrounding the cable conduit supports a permeable basket that surrounds the electrode and controls the flow of fluid electrolyte over its surface.

To insure that the sealing fluid is deep in the thief zones, the electrical heating is induced only after the fluid has traveled one-third the distance toward a production well. Preferably, the push water has also traveled at least one-tenth the distance toward a production well.

After the heating has commenced, push water is injected to cool the near-wellbore fluid and to avoid sealing zones other than in the thief zones.

After the thief zones are plugged, the heating is shut down to avoid heating other zones. Also, the injection of the push water is stopped after the thief zones are plugged. The heating is controlled to supply enough heat to cause the heat-sensitive sealing fluid to undergo in-situ transformation to seal the thief zones, but not to supply enough heat to seal adjacent less-permeable zones. Therefore, it is essential to stop the heating as soon as the thief zones are sealed.

ADVANTAGES OF THE PRESENT INVENTION

Some of the advantages of this method over other methods are as follows:

The sealing fluid can be injected deep into the thief zones.

Only a single fluid is injected, thus the flow pattern in the formation would be more certain than for multiple fluid injections.

The timing and degree of sealing is controlled by the start and duration of the applied heating process. This is in contrast to other methods where the timing and degree of sealing is dictated by reservoir flow characteristics, with little operator control.

The heating distribution throughout the thief zones is more uniform than can be achieved by conductive or convective heat transfer.

The temperature rise in the formation is confined to a narrow path of electrical current from one electrode to the other.

In any injection method there is unavoidable cross flow between strata. Some of the sealing fluid will seep into adjacent zones of lower permeability. Since the conductivity in those zones would be much lower, the current flow and rate of heating would be much slower. Thus, with proper control of the heating process, the sealing could be limited to the thief zones.

Another factor that would limit sealing to the thief zones is the fact that brine resistivity decreases with increasing temperature. Thus, the low resistance path becomes even more conductive and channels more current flow. High current flow results in faster heating and higher temperatures in the thief zone.

Referring to FIG. 2, in one embodiment of the present invention, thief zones are sealed in a five-spot well injection pattern. To direct the current flow within the thief zones, the formation is first pre-flushed with a saline pre-flush water (1% NaCl). Then a sufficient amount of a saline heat-sensitive sealing fluid 5 to 10% NaCl) is injected into the thief zone. That sealing fluid reaches a final radius of about one-third the distance between the injection and production wells. Very high salinity push water (20% NaCl) is then injected to a radius of about one-tenth the distance between the injection and production wells. Voltage is then applied to the electrodes, accompanied by continued push water injection to keep the electrodes from overheating. To prevent short circuiting through the production well in the middle of the current path, non-conductive hydrocarbon fluids (crude or diesel oil) may be injected to surround the production wellbore. Finally, the electrical heating and the injection of the push water are both stopped.

While the present invention has been described with reference to specific embodiments, this application is intended to cover those various changes and substitutions which may be made by those skilled in the art without departing from the spirit and scope of the appended claims.

What is claimed is:

1. A method for selectively sealing thief zones in a formation penetrated by an injection well and a production well, said method comprising the sequential steps of:
    (a) injecting a saline pre-flush water into the injection well;
    (b) injecting at least one slug of a saline solution of heat-sensitive sealing fluid into the injection well;
    (c) injecting a saline push water into the injection well; and
    (d) inducing electrical resistance heating of the formation sufficient to cause said sealing fluid to undergo in-situ transformation to seal the thief zones.

2. A method according to claim 1 wherein said electrical heating is induced after said sealing fluid has traveled at least one-third the distance between the injection well and the production well.

3. A method according to claim 1 wherein said electrical heating is induced after said push water has traveled at least one-tenth the distance between the injection well and the production well.

4. A method according to claim 1 wherein said electrical heating is induced between two diagonal injection wells in a five-spot pattern.

5. A method according to claim 1 wherein mechanical packers are used so that said solution of sealing fluid and said push water are injected primarily into the thief zones.

6. A method according to claim 1 wherein the injection of said push water is continued while said electrical heating is being induced.

7. A method according to claim 1 wherein the salinity of said solution of sealing fluid is higher than the salinity of said pre-flush water but is lower than the salinity of said push water.

8. A method according to claim 1 wherein said sealing fluid is selected from the group consisting of alkaline metal silicate and lignosulfonate.

9. A method for selectively sealing thief zones in a formation penetrated by four injection wells and a production well in a five-spot injection well pattern, said method comprising the sequential steps of:

(a) injecting a saline pre-flush water into two diagonal injection wells of said five-spot injection well pattern;

(b) injecting slugs of a saline solution of heat-sensitive sealing fluid into said two injection wells, wherein said sealing fluid is selected from the group consisting of alkaline metal silicate and lignosulfonate, and wherein the salinity of said solution of sealing fluid is higher than the salinity of said pre-flush water;

(c) injecting a saline push water into said two injection wells, wherein the salinity of said push water is higher than the salinity of said solution of sealing fluid;

(d) inducing electrical resistance heating of the formation between said two injection wells sufficient to cause said sealing fluid to undergo in-situ transformation to seal the thief zones, wherein the injection of said push water is continued while said electrical heating is being induced; and (e) discontinuing said electrical heating and said injection of push water.

10. A method according to claim 9 wherein said heating is induced after said sealing fluid has traveled at least one-third the distance between the injection well and the production well.

11. A method according to claim 9 wherein said heating is induced after said push water has traveled at least one-tenth the distance between the injection well and the production well.

12. A method according to claim 9 wherein mechanical packers are used so that said solution of sealing fluid and said push water are injected primarily into the thief zones.

* * * * *